United States Patent [19]

Son et al.

[11] Patent Number: 4,647,859

[45] Date of Patent: Mar. 3, 1987

[54] METHOD FOR EFFECTING ELECTRIC WELL LOGGING WITH INTRODUCTION OF A FLUID COMPOSITION TO MINIMIZE THE EFFECT OF INTERFERING IONS

[75] Inventors: Adelina J. Son; Royal E. Loftin, both of Houston, Tex.

[73] Assignee: Halliburton Company, Duncan, Okla.

[21] Appl. No.: 749,916

[22] Filed: Jun. 27, 1985

Related U.S. Application Data

[63] Continuation-in-part of Ser. No. 572,103, Jan. 19, 1984, Pat. No. 4,536,297.

[51] Int. Cl.$^4$ ............................ G01V 3/18; C09K 7/00
[52] U.S. Cl. ..... 324/323; 252/8.51; 252/8.57; 324/366
[58] Field of Search ................................. 324/323–325, 324/351, 355, 366, 367; 252/8.5 R, 8.5 A, 8.5 C; 73/153

[56] References Cited

U.S. PATENT DOCUMENTS

| | | | |
|---|---|---|---|
| 2,172,625 | 9/1939 | Schlumberger | 324/366 |
| 2,230,999 | 2/1941 | Doll | 324/351 |
| 2,552,775 | 3/1951 | Fischer et al. | 252/8.5 A |
| 2,873,423 | 2/1959 | Graham et al. | 324/323 |
| 3,017,351 | 1/1962 | Scott et al. | 252/8.5 C |
| 3,086,937 | 4/1963 | Fischer | 252/8.5 C |
| 3,116,449 | 12/1963 | Vogel | 324/355 X |
| 3,209,588 | 10/1965 | Terry | 324/367 X |
| 3,377,550 | 4/1968 | Osoba et al. | 324/351 |
| 3,956,140 | 5/1976 | Nahm et al. | 252/8.5 A X |
| 4,142,595 | 3/1979 | Anderson et al. | 252/8.5 C X |

*Primary Examiner*—Gerard R. Strecker
*Attorney, Agent, or Firm*—Robert A. Kent

[57] ABSTRACT

A method of effecting an improved electric log of a subterranean clay-containing formation ion which a chloride-containing fluid is present which comprises introducing a fluid composition comprising a selected potassium salt of a water-soluble organic acid which stabilizes said clay-containing formation and reduces the chloride-induced interference with the electric log into said formation prior to effecting the electric well log.

14 Claims, No Drawings

METHOD FOR EFFECTING ELECTRIC WELL LOGGING WITH INTRODUCTION OF A FLUID COMPOSITION TO MINIMIZE THE EFFECT OF INTERFERING IONS

The present invention is a continuation-in-part of copending patent application Ser. No. 572,103 filed Jan. 19, 1984, entitled "Well Drilling and Completion Fluid Composition", now U.S. Pat. No. 4,536,297, the entire contents of which are incorporated herein by reference.

BACKGROUND OF THE INVENTION

A great variety of aqueous drilling and completion fluid compositions have been developed and used heretofore. Problems which have been commonly encountered in the use of such drilling and completion fluids are that when high temperatures are encountered, the fluids become unstable, that is the viscosity and other properties are lost or reduced, and when the fluids come into contact with water-sensitive clay-containing formations or strata, the clay-containing materials slough off the walls of the well bore into the fluids. The sloughing of formation materials into the drilling and completion fluids can cause borehole instability and hole enlargement.

Heretofore, the sloughing of clay-containing formation materials comprising water-sensitive shales into a well bore, when contacted by aqueous drilling or completion fluids, has been reduced by including potassium chloride or potassium hydroxide in the drilling or completion fluids. While aqueous fluids containing potassium chloride or potassium hydroxide are effective in reducing the swelling of clays and the sloughing of clay-containing materials when in contact therewith, a number of other problems are inherent in the use of such solutions.

Drilling fluids containing potassium chloride in the quantity required to provide sufficient potassium ion concentration to prevent clay swelling and sloughing of formation materials frequently have demonstrated unstable rheological and filtration control properties. The high chloride ion content also causes the fluids to be more corrosive to tubular goods in the well bore and creates disposal problems. In addition, high chloride ion levels in drilling and completion fluids make electric logs and other analytical procedures carried out therein more difficult to interpret. That is, the chloride-containing fluids create a conductive medium which surrounds the logging apparatus in the well bore during use and hampers the investigation of the formations adjoining the conductive medium.

The use of potassium hydroxide in lieu of potassium chloride brings about more stable drilling and completion fluids, but the quantity of potassium hydroxide that can be used must be limited to prevent the fluids from becoming excessively caustic and corrosive. The presence of hydroxyl ions in the fluids offsets the effectiveness of potassium ions therein because hydroxyl ions promote hydration and dispersion of clays. Further, dispersants must normally be used in drilling or completion fluids containing potassium hydroxide which bring about the adverse result of dispersing cuttings in the fluids.

Other potassium compounds such as potassium carbonate and potassium bicarbonate have been utilized in well treatment fluids, but such compounds also cause the fluids to be unstable, etc. It would be desirable to develop a method by which the formation surrounding a well bore could be stabilized against detrimental formation degradation while creating an environment that facilitates investigation of the formation by electric well logging.

SUMMARY OF THE INVENTION

By the present invention, an improved fluid is provided which can be weighted with solid weighting agents to obtain densities from about 8.5 to about 19 pounds per gallon, which has a high tolerance for solids and cement contamination, which is insensitive to salt water intrusion, which can be used at temperatures up to 450° F. without losing desired rheological properties, which has a low tubular goods corrosion rate, which prevents or reduces the sloughing of water-soluble clay-containing materials when in contact therewith and which creates an environment which is more acceptable to the performance of electric logs, thereby facilitating their interpretation, than fluids containing significant quantities of chloride ions.

DESCRIPTION OF THE PREFERRED EMBODIMENT

The fluid composition of this invention are comprised of water, a viscosity increasing agent which also functions as a fluid loss reducer, a fluid loss reducing and rheology stabilizing agent and a clay-stabilizing agent which also functions to reduce interference of the fluid composition in interpretation of electric logging results. The clay-stabilizing agent substantially prevents either or both swelling and dispersion of water-sensitive clay-containing materials contacted by the fluid compositions, but does not make the compositions highly corrosive or toxic. The compositions can optionally include solid weighting agents, additional rheology stabilizers and basic compounds for adjusting the pH of the composition to desired levels.

The water utilized in the compositions can be fresh water, brines or seawater, however, fresh water is preferred, and the viscosity increasing agent can be any of a variety of hydratable gelling agents which hydrate in the water used to increase the viscosity thereof. Examples of such viscosity increasing agents are xanthum gum, hydroxyethylcellulose, sepiolite clay, attapulgite, and montmorillonite clay. Of the foregoing, sepiolite clay and attapulgite clay are preferred in that they readily increase the viscosity of fresh water, brines and salt water and do not lose stability at high temperatures, that is, such viscosity increasing agents are stable and maintain the viscosity of an aqueous composition over a temperature range up to about 450° C. The most preferred viscosity increasing agent for use in the compositions of this invention is sepiolite clay. The fluid loss reducing and rheology stabilizing agent utilized in accordance with the present invention is selected from the group consisting of pregelatinized starch, vinylamide-vinylsulfonate terpolymer, hydroxethyl-cellulose and mixtures thereof. If fluid composition is to be subjected to temperatures below about 250° F., pregelatinized starch is preferred for its relatively low cost. When the composition is to be subjected to temperatures in the range of from about 250° F. up to about 450° F., vinylamide-vinylsulfonate terpolymer is preferred in that it retains its stability and effectiveness at such temperatures. As indicated, the fluid loss reducing and rheology stabilizing agent reduces fluid loss to permeable formations encountered in a well bore and functions to maintain the rheological properties of the fluid composition at a substantially constant level in spite of solids and cement contamination, salt water intrusion and high temperatures.

The vinylamide-vinylsulfonate terpolymer is available as a fine white granular solid and is prepared by reacting 2-acrylamido-2 methyl-3-propyl sodium sulfonate, vinylacetamide and acrylamide monomers to form a terpolymer thereof. The terpolymer is readily dissolvable in fresh water, salt water and seawater, and as mentioned above, the terpolymer remains stable and effective over broad pH and temperature ranges. The terpolymer and its synthesis are described in greater detail in West German Pat. No. 2,931,897 dated Feb. 26, 1981, which corresponds to U.S. Pat. No. 4,309,523 issued Jan. 5, 1982, which is incorporated herein by reference.

The clay-stabilizing agent functions to substantially reduce breakage of clay-containing particles in contact with the composition of the present invention by substantially preventing the swelling and hydration of clays when in contact with the compositions. The clay-stabilizing agent functions to improve the performance of electric logs by reducing the interference caused by the fluid composition by shielding the logging instrument from excessive quantities of chloride ions. The clay-stabilizing agent utilized in accordance with the present invention is a water-soluble clay-stabilizing organic acid salt or mixture of salts having the general formula:

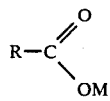

wherein: R is hydrogen or a methyl, ethyl or propyl radical; and M is potassium.

Such organic acid salts are readily soluble in water, brines and seawater. Examples of such compounds are potassium formate, potassium acetate, potassium propionate and potassium butyrate.

The preferred clay-stabilizing salt is potassium acetate. Potassium acetate has low toxicity, is readily soluble in fresh water, brines and seawater and aqueous compositions including potassium acetate are considerably less corrosive to tubular goods than the heretofore used compositions and significantly improves the quality of an electric log in comparison to a log effected in a fluid containing significant quantities of chloride ions.

The clay-stabilizing organic salt or salts can be present in the aqueous solution in an amount in the range of from about 1 to about 100 pounds per barrel of the aqueous solution. At concentrations below about 1 pound per barrel, the composition of the present invention fails to effectively prevent the swelling of water-sensitive clays and the sloughing of clay-containing materials. At concentrations above about 100 pounds per barrel, little additional effect is brought about for the additional cost involved.

As mentioned above, the composition preferably also include a base, such as sodium or potassium hydroxide present therein in a quantity sufficient to adjust the pH of the composition to a level in the range of from about 8.5 to about 11.5. At such pH range, the compositions are stable and relatively non-corrosive to metal tubular goods.

In addition, the compositions can optionally include a solid weighting agent, such as barite, hematite, etc., for increasing the density thereof to desired levels. The weighting agent can be present in the compositions in an amount such that the compositions have a density as high as 19 pounds per gallon while remaining stable, etc. When a weighting agent is included in the compositions it is also advantageous to include an additional rheology stabilizer therein which facilitates the dispersal and suspension of the weighting agent in the compositions. Particularly suitable such rheology stabilizers are the sodium salt of polymerized alkyl naphthalene sulfonic acid (polymerized alkyl naphthalene sodium sulfonate), citric acid and gluconic acid.

In carrying out the methods of the present invention utilizing the compositions, the water-sensitive clay-containing formations which are to be prevented from sloughing while an electric log of the well bore is effected are contacted with the composition allowing the clayey materials to base exchange and dehydrate. In this regard, the water sensitive formation can be contacted with a composition of the present invention whereby hydration and swelling of clays is inhibited. Preferably, when aqueous fluids containing chlorides are present in the well bore, such fluids are displaced by the fluid composition of the present invention prior to effecting the electric log. For example, in the drilling or completion of a well, wherein a chloride-containing fluid is utilized such as a potassium chloride solution as the drilling or completion fluid prior to introducing the electric logging apparatus into the well bore, a quantity of the fluid composition of the present invention is introduced into the zone to be logged to displace the chloride-containing fluid therefrom.

In a preferred embodiment of the present invention, the composition of the present invention is utilized as the drilling or completion fluid. The electric logging apparatus then is positioned in the well bore in the zone in which an electric log is to be effected. The selected zone then is logged whereby a measurement of the formation rock matrix resistivity and formation fluid resistivity is effected without substantial interference caused by the presence of artificially introduced interferring ion-containing solutions in the formation.

A particularly suitable fluid composition of the present invention is comprised of water, a viscosity increasing agent selected from the group consisting of sepiolite clay, and attapulgite clay present in the composition in an amount in the range of from about 1 to about 50 pounds per barrel of fluid, a fluid loss reducing and rheology stabilizing agent selected from the group consisting of pregelatinized starch, vinylamide-vinylsulfonate terpolymer and mixtures thereof present in the composition in an amount in the range of from about 1 to about 30 pounds per barrel of fluid, and a clay stabilizing agent comprised of a water-soluble organic acid salt selected from the group consisting of a salt or mixture of salts having the general formula:

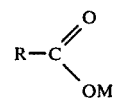

wherein: R is hydrogen or a methyl, ethyl or propyl radical, and M is potassium, the clay stabilizing agent being present in the composition in an amount in the range of from about 1 to about 100 pounds per barrel of fluid.

The above composition can include one or more weighting agents such as barite, hematite, etc., in an amount sufficient to increase the density thereof up to about 19 pounds per gallon, such as, an amount in the range of from about 5 to about 600 pounds per barrel of fluid. As mentioned above, the composition can also include sodium or potassium hydroxide in a quantity in the range of from about 0 to about 5 pounds per barrel of fluid to adjust the pH to a level in the range of from about 8.5 to about 12.0, and an additional rheology stabilizer, such as, polymerized alkyl naphthalene sodium sulfonate, in a quantity in the range of from about 0 to about 5 pounds per barrel of fluid.

In order to facilitate a clear understanding of the present invention, the following examples are given.

EXAMPLE 1

Fluid formulations are prepared as follows. Add potassium acetate to seawater and mix to dissolve (about 2 minutes). Add sepiolite clay and mix for 8 minutes to allow the sepiolite to hydrate. Add vinylamide-vinylsulfonate terpolymer, followed by the sodium salt of polymerized alkyl naphthalene sulfonic acid. Adjust the pH of the solution with caustic soda to around 9.0. For a weighted system, add the necessary quantity of barite and mix for another 10 minutes.

The properties of weighted and unweighted fluid formulations prepared in accordance with the above procedure are given in Table I below.

TABLE I

| | FLUID FORMULATION PROPERTIES | | | | | | | | | |
|---|---|---|---|---|---|---|---|---|---|---|
| Sample No. | 1 | | 2 | | 3 | | 4 | | 5 | |
| Conditions | I | HR | I | HR | I | HR | I | HR | I | HR |
| Water, ml. | 350 | | 332 | | 300 | | 279 | | 252 | |
| Sea salt, ppb | 14.7 | | 14.0 | | 12.6 | | 11.0 | | 10.6 | |
| Potassium acetate, ppb | 10.0 | | 9.5 | | 8.6 | | 8.0 | | 7.2 | |
| Sepiolite, ppb | 25.0 | | 22.5 | | 20.0 | | 15.0 | | 12.5 | |
| Terpolymer, ppb | 3.0 | | 3.0 | | 3.0 | | 3.0 | | 3.0 | |
| Sodium hydroxide, ppb | 0.25 | | 0.25 | | 0.25 | | 0.25 | | 0.25 | |
| Alkyl naphthalene sodium sulfonate, ppb | 0.5 | | 0.5 | | 0.5 | | 0.5 | | 0.5 | |
| Barite, ppb | | | 78 | | 203 | | 299 | | 410 | |
| YP, #/100 ft$^2$ | 2 | 3 | 6 | 4 | 2 | 4 | 4 | 2 | 2 | 10 |
| Gels, 1/10 minutes | 2/2 | 2/2 | 2/4 | 2/3 | 2/3 | 1/3 | 2/4 | 2/5 | 4/8 | 4/8 |
| pH | 9.5 | 9.0 | 9.5 | 9.0 | 9.5 | 8.9 | 9.5 | 8.8 | 9.6 | 8.8 |
| API fluid loss, ml. | | 10.6 | | | | | | 8.8 | | |
| Weight, ppg | 8.6 | | 10.0 | | 12.0 | | 14.0 | | 16.0 | |
| mg/l K | 10,000* | | | | 10,175* | | | | 10,450* | |

I = initial
HR = hot-rolled 16 hours at 150° F.
*Analysis by atomic absorption

EXAMPLE 2

The fluid formulations shown in Table I and prepared in accordance with the procedure given in Example 1 are tested for tolerance to solids contamination. Grundite shale is used as the solid contaminant. The shale has the following composition:

| α-quartz | 20–22% |
|---|---|
| Pyrite | 3–5% |
| Chlorite | 4–6% |
| Illite | 40–45% |
| Smectite and mixed layer clays | 21–25% |
| Amorphous | 4–6% |
| CEC* = 10.6 meq/100 grams shale | |
| Potassium | 248 mg/l |
| Magnesium | 1250 mg/l |
| Calcium | 2710 mg/l |
| Sodium | 42 mg/l |

The results of the solids contamination tests are summarized in Table II below.

TABLE II

DRILLING OR COMPLETION FLUID FORMULATION TOLERANCE TO DRILL SOLIDS

| Percent Solids (ppb solids) | Fluid Weight, ppg | YP I | YP HR | Gels I | Gels HR |
|---|---|---|---|---|---|
| 0 (0) | 8.6 | 2 | 3 | 2/2 | 2/2 |
| 3 (10.5) | 8.6 | 2 | 0 | 1/2 | 1/1 |
| 6 (21.0) | 8.6 | 2 | 1 | 1/1 | 1/3 |
| 10 (35.0) | 8.6 | 2 | 1 | 0/2 | 1/2 |
| 15 (52.5) | 8.6 | 2 | 4 | 2/4 | 1/3 |
| 0 (0) | 10.0 | 6 | 4 | 2/4 | 2/3 |
| 3 (10.5) | 10.0 | 8 | 4 | 3/4 | 2/3 |
| 6 (21.0) | 10.0 | 4 | 6 | 2/4 | 3/3 |
| 10 (35.0) | 10.0 | 6 | 6 | 2/4 | 2/3 |
| 15 (52.5) | 10.0 | 6 | 4 | 2/6 | 2/5 |
| 0 (0) | 12.0 | 2 | 4 | 2/3 | 1/3 |
| 3 (10.5) | 12.0 | 0 | 4 | 2/3 | 1/4 |
| 6 (21.0) | 12.0 | 2 | 4 | 2/3 | 1/3 |
| 10 (35.0) | 12.0 | 4 | 4 | 2/4 | 2/3 |
| 15 (52.5) | 12.0 | 4 | 4 | 2/5 | 2/6 |
| 0 (0) | 14.0 | 4 | 2 | 2/4 | 2/5 |
| 3 (10.5) | 14.0 | 0 | 2 | 2/3 | 3/5 |
| 6 (21.0) | 14.0 | 3 | 4 | 3/5 | 2/5 |
| 10 (35.0) | 14.0 | 4 | 4 | 2/5 | 2/6 |
| 15 (52.5) | 14.0 | 6 | 4 | 2/6 | 2/7 |
| 20 (70.0) | 14.0 | 10 | 12 | 3/13 | 4/12 |
| 25 (87.5) | 14.0 | 16 | 16 | 4/20 | 5/19 |
| 30 (105) | 14.0 | 22 | 26 | 5/28 | 8/29 |

Up to 70 ppb solids are tolerated by the formulations without significant changes in the rheology even at 14 ppg mud weight. Solids up to 105 ppb added to a 14 ppg fluid increase the yield point and the gels, although the rheological properties are still acceptable. The terpolymer is kept at 3 ppb in all the tests. Increasing the concentration of the vinylamide-vinylsulfonate terpolymer promotes rheological stabilization and higher levels of solids can be tolerated by the fluid formulations.

EXAMPLE 3

Fluids of various weights are formulated in accordance with the procedure of Example 1 and the quantities of components given in Table I, except the concentration of the alkyl naphthalene sodium sulfonate is increased to 5 ppb. The fluids are tested for green cement contamination by adding 3% green cement and 10% drill solids to the fluids. The results are summarized in Table III below.

TABLE III

FLUID TOLERANCE TO GREEN CEMENT CONTAMINATION

| | Weight, ppg | | | | | | | | |
|---|---|---|---|---|---|---|---|---|---|
| | 8.6 | | 10.0 | | 12.0 | | 14.0 | | 16.0 | |
| | I | HR | I | HR | I | HR | I | HR | I | HR |
| PV, cps | 8 | 10 | 12 | 12 | 19 | 22 | 24 | 25 | 36 | 50 |
| YP, lbs/100 ft$^2$ | 2 | 2 | 2 | 4 | 4 | 10 | 2 | 8 | 12 | 22 |
| Gels, | 2/3 | 1/3 | 2/2 | 2/5 | 2/4 | 4/17 | 2/4 | 4/13 | 4/22 | 17/52 |
| pH | 11.3 | 11.9 | 11.3 | 11.8 | 11.4 | 11.8 | 11.4 | 11.8 | 11.5 | 11.8 |
| API fluid loss, cc | | 19.0 | | 17.5 | | 13.5 | | 12.2 | | |

I = initial
HR = hot-rolled 16 hours at 150° F.

Rheological properties can be improved by the addition of more alkyl naphthalene sodium sulfonate or the vinylamide-vinylsulfonate terpolymer. The latter is more effective. For example, the addition of 2 ppb of the alkyl naphthalene sodium sulfonate to a 16 ppg sample, hot-rolled for 16 hours, decreases the yield point from 22 to 16 and gels from 17/52 to 5/25. On the other hand, the addition of 2 ppb of the terpolymer brings the yield point from 22 to 4 and the gels from 17/52 to ⅔.

EXAMPLE 4

The procedure of Example 3 is repeated except that 5% green cement and 10% drill solids are used. The 5% green cement and 10% drill solids result in higher but still acceptable gels. The fluid formulations are as shown in Table I except the alkyl naphthalene sodium sulfonate level is raised to 6 ppb. The results of these tests are given in Table IV below.

TABLE IV

FLUID TOLERANCE TO GREEN CEMENT CONTAMINATION

| | Weight, ppg | | | | | | | | |
|---|---|---|---|---|---|---|---|---|---|
| | 8.6 | | 10.0 | | 12.0 | | 14.0 | | 16.0 | |
| | I | HR | I | HR | I | HR | I | HR | I | HR |
| PV, cps | 12 | 11 | 12 | 17 | 19 | 24 | 23 | 26 | 32 | 40 |
| YP, lbs/100 ft$^2$ | 0 | 24 | 2 | 11 | 4 | 20 | 2 | 12 | 10 | 28 |
| Gels, | 2/3 | 23/47 | 2/3 | 5/28 | 2/11 | 14/51 | 2/13 | 5/35 | 5/32 | 15/76 |
| pH | 11.8 | 12.0 | 11.8 | 12.0 | 11.8 | 12.0 | 11.8 | 12.0 | 11.7 | 11.8 |

I = initial
HR = hot-rolled 16 hours at 150° F.

EXAMPLE 5

The temperature stability of water-based fluids often is limited by the polymeric components. The terpolymer used in this system is stable to over 450° F. and is resistant to hydrolysis.

The temperature stability of the 14 ppg fluid shown in Table I is modified to include 5 ppb vinylamide/vinylsulfonate polymer and 1 ppb alkyl naphthalene sodium sulfonate.

Fluid Properties:

| | |
|---|---|
| PV, cps | 31 |
| YP, lbs/100 ft$^2$ | 8 |
| Gels | 3/4 |
| API fluid loss, cc | 6.6 |
| HTHP filtrate (300° F.), cc | 34.0 |
| pH | 9.5 |

The effect of temperature and pressure on the fluid is determined using a Model 50 Fann consistometer. The fluid becomes thin with higher temperature and pressure and recovers its consistency on cooling as shown in Table V below.

TABLE V

CONSISTOMETER DATA

| Temperature, °F. | Pressure, psi | Consistometer Units* |
|---|---|---|
| 75 | 1,000 | 56 |
| 100 | 2,000 | 44 |
| 150 | 4,000 | 36 |
| 200 | 7,000 | 30 |
| 250 | 8,000 | 26 |
| 300 | 9,000 | 24 |
| 350 | 9,500 | 20 |
| 375 | 9,500 | 20 |
| 400 | 10,000 | 22 |
| 440 | 10,000 | 12 |
| cooled to 75 | | 50 |

*arbitrary units

The rheological properties of the 14 ppg fluid, contaminated with 35 ppb drill solids, remains stable after 16 hours static aging at 350° F. as shown in Table VI below.

TABLE VI

EFFECT OF TEMPERATURE ON RHEOLOGY

| Fluid: | 14 ppg |
|---|---|
| Drill Solids: | 35 ppb |

TABLE VI-continued

| EFFECT OF TEMPERATURE ON RHEOLOGY | | |
|---|---|---|
| Terpolymer: | 5 ppb | |
| Properties | Initial | Static-Aged |
| PV, cps | 32 | 21 |
| YP, lbs/100 ft$^2$ | 8 | 6 |
| Gels | 2/4 | 2/5 |
| pH | 7.1 | 7.1 |
| API filtrate, cc | | 14.5 |

EXAMPLE 6

Shale stabilization tests are conducted with gumbo shale (containing over 50% smectite) to determine how much potassium is needed for optimum stabilization. Small pieces of gumbo shale are added to unweighted fluids with varying amounts of potassium and hot-rolled for 16 hours at 150° F. The results of these tests are given in Table VII below.

TABLE VII

| FLUID SHALE STABILIZATION | | | | | | |
|---|---|---|---|---|---|---|
| ppb CH$_3$CO$_2$K | 5 | 10 | 15 | 20 | 25 | 30 |
| ppm K* | 5650 | | 16250 | | | 32250 |

TABLE VII-continued

| FLUID SHALE STABILIZATION | | | | | | |
|---|---|---|---|---|---|---|
| ppb CH$_3$CO$_2$K | 5 | 10 | 15 | 20 | 25 | 30 |
| Wt. of shale, init., grams | 21.43 | 14.67 | 11.48 | 12.51 | 10.32 | 9.46 |
| Wt. of shale, after hot-rolling | 18.17 | 11.08 | 9.64 | 10.02 | 8.22 | 7.92 |
| Wt. loss, grams | 3.26 | 3.59 | 1.84 | 2.49 | 2.10 | 1.54 |
| % loss | 15.21 | 24.47 | 16.03 | 19.90 | 20.45 | 16.28 |

*analysis by atomic absorption

Each shale sample remains in solid form with no cracks. Each sample shows signs of dehydration. The results indicate that even with 5 ppb (less than 1% K), fluids have good clay stabilization properties.

EXAMPLE 7

The fluids of this invention can be prepared in fresh water. Other polymers, such as starch, hydroxyethylcellulose, etc., can be substituted for the terpolymer in low temperature applications. The starch-containing fluids can be converted to high temperature fluids if needed. Examples of fresh water formulations with different polymers are given in Tables VIII and IX below.

TABLE VIII

| | FRESH WATER, UNWEIGHTED FLUIDS | | | | | | | |
|---|---|---|---|---|---|---|---|---|
| | 1 | | 2 | | 3 | | 4 | |
| Additives, ppb | | | | | | | | |
| Potassium acetate | 10.0 | | 10.0 | | 10.0 | | 10.0 | |
| Sepiolite | 15.0 | | 15.0 | | 15.0 | | 15.0 | |
| Starch | 10.0 | | 5.0 | | 7.0 | | 10.0 | |
| Vinylamide-vinylsulfonate terpolymer | | | | | 2.0 | | | |
| Alkyl naphthalene sodium sulfonate | 0.5 | | 0.5 | | 0.5 | | | |
| Hydroxyethylcellulose | | | 2.0 | | | | | |
| Sodium hydroxide | 0.25 | | 0.25 | | 0.25 | | 0.25 | |
| | I | HR | I | HR | I | HR | I | HR |
| AV, cps | 13 | 12 | 8 | 6.5 | 9 | 9 | 8 | 10 |
| PV, cps | 8 | 7 | 8 | 6 | 8 | 8 | 6 | 7 |
| YP, lbs/100 ft$^2$ | 10 | 10 | 0 | 1 | 2 | 2 | 4 | 6 |
| Gels | 4/7 | 4/7 | 0/2 | 0/2 | 0/2 | 1/2 | 2/8 | 2/8 |
| pH | 10.8 | 9.8 | 10.7 | 9.8 | 10.1 | 9.7 | 10.5 | 10.6 |
| API fluid loss, cc | | 6.0 | | 10.6 | | 6.5 | | 6.0 |
| ppm Potassium | 10,000 | | 10,000 | | 10,000 | | 10,000 | |

I = initial
HR = hot-rolled for 16 hours at 150° F.

TABLE IX

| | FRESH WATER, WEIGHTED FLUIDS | | | | | | | |
|---|---|---|---|---|---|---|---|---|
| | 1 | | 2 | | 3 | | 4 | |
| Additives, ppb | | | | | | | | |
| Potassium acetate | 9.5 | | 8.6 | | 8.0 | | 6.5 | |
| Sepiolite | 15.0 | | 15.0 | | 15.0 | | 10.0 | |
| Starch | 10.0 | | 10.0 | | 10.0 | | | |
| Vinylamide-vinylsulfonate terpolymer | | | | | | | 3.0 | |
| Alkyl naphthalene sodium sulfonate | 0.5 | | 0.5 | | 5.0 | | 5.0 | |
| Sodium hydroxide | 0.25 | | 0.25 | | 0.25 | | 0.5 | |
| Barite | 78.0 | | 203.0 | | 299.0 | | 564.0 | |
| | I | HR | I | HR | I | HR | I | HR |
| AV, cps | 12 | 13 | 23 | 28 | 32.5 | 34 | 71 | 66 |
| PV, cps | 9 | 8 | 16 | 12 | 20 | 25 | 50 | 48 |
| YP, lbs/100 ft$^2$ | 6 | 10 | 14 | 32 | 25 | 18 | 42 | 35 |
| Gels | 0/4 | 2/17 | 4/29 | 24/50 | 8/14 | 9/30 | 10/46 | 7/25 |
| pH | | 9.9 | | 9.3 | | 8.5 | | 8.2 |
| API fluid loss, cc | | 5.8 | | 9.6 | | 7.0 | | 5.6 |
| Wt. ppg | 10.0 | | 12.0 | | 14.0 | | 18.6 | |

TABLE IX-continued

| FRESH WATER, WEIGHTED FLUIDS | | | | |
|---|---|---|---|---|
| | 1 | 2 | 3 | 4 |
| ppm Potassium | 10,00 | 10,000 | 10,000 | 10,000 |

I = initial
HR = hot-rolled for 16 hours at 150° F.

EXAMPLE 8

The fresh water fluids are also tested for tolerance to solids contamination. The results are summarized in Table X below. Formulation 1, with no potassium acetate, gives high yield point and gels. In the presence of potassium acetate (Formulation 2), the yield points and the gels are much lower. This demonstrates that potassium acetate has improved the ability of the fluid to tolerate solids contamination (grundite shale). Formulations 3 with 70 ppb drill solids shows insignificant changes in rheological properties. The addition of the terpolymer causes further lowering of the yield point and the gels, indicating that the terpolymer also improves tolerance to solids contamination promoting rheological stabilization.

TABLE X

| TOLERANCE TO SOLIDS CONTAMINATION, FRESH WATER FLUIDS | | | | | | | | |
|---|---|---|---|---|---|---|---|---|
| | 1 | | 2 | | 3 | | 4 | |
| Additives, ppb | | | | | | | | |
| Potassium acetate | | | 10.0 | | 10.0 | | 10.0 | |
| Sepiolite | 15.0 | | 15.0 | | 15.0 | | 15.0 | |
| Starch | | | | | | | 7.0 | |
| Vinylamide-vinylsulfonate terpolymer | | | | | | | 2.0 | |
| Alkyl naphthalene sodium sulfonate | 0.5 | | 0.5 | | 0.5 | | 0.5 | |
| Sodium hydroxide | 0.25 | | 0.25 | | 0.25 | | 0.25 | |
| Grundite shale | 35.0 | | 35.0 | | 70.0 | | 70.0 | |
| | I | HR | I | HR | I | HR | I | HR |
| AV, cps | 67 | 53 | 13 | 12 | 14 | 13 | 13 | 12 |
| PV, cps | 28 | 14 | 10 | 9 | 10 | 10 | 12 | 11 |
| YP, lbs/100 ft$^2$ | 78 | 78 | 6 | 6 | 7 | 5 | 2 | 2 |
| Gels | 16/22 | 38/38 | 3/6 | 3/8 | 3/10 | 3/7 | 2/2 | 2/2 |
| ppm Potassium | 0.0 | | 10,000 | | 10,000 | | 10,000 | |

I = initial
HR = hot-rolled for 16 hours at 150° F.

EXAMPLE 9

Fresh water fluids are prepared containing 10,000 ppm K using potassium chloride and potassium acetate. Pieces of gumbo shale with over 50% smectite are immersed in the fluids and hot-rolled for 16 hours at 150° F. The potassium acetate demonstrates better shale stabilization qualities.
Data:

| (1) KCl fluid | |
|---|---|
| Wt. of gumbo shale | 7.45 grams |
| After 16 hrs., 150° F. hot-rolling | 6.00 grams |
| Weight loss | 1.45 grams |
| % weight loss | 19.45% |
| (2) CH$_3$CO$_2$K fluid | |
| Weight of gumbo shale | 7.45 grams |
| After 16 hrs., 150° F. hot-rolling | 6.48 grams |
| Weight loss | 0.97 grams |
| % weight loss | 13.02% |

EXAMPLE 10

Corrosion is a problem with potassium chloride solutions which are much below saturation levels. The potassium acetate fluid is tested for corrosion properties.

Solutions of potassium chloride and potassium acetate are prepared containing 10,000 ppm K. Corrosion tests are run for 167 hours at 150° F. With the KCl fluid, the corrosion rate is 13 mils per year while with the potassium acetate fluid, the corrosion rate is 3.6 mils per year, a fourfold improvement.

EXAMPLE 11

To evaluate the effect that potassium chloride solutions and potassium acetate solutions have upon well logging studies, the following tests were performed.

Fluid compositions containing from about 1,000 to about 15,000 milligrams per liter of potassium were prepared. Combinations of these fluids then were prepared and several synthetic drilling fluids also were prepaid utilizing potassium chloride and potassium acetate to simulate fluid in a well bore. The resistivity of each of the fluid samples then was determined. In well logging operations, the resistivity of a fluid in the well bore preferably is as close to that of pure water as possible to minimize interference of the fluid in measuring the resistivity or conductivity of the subterranean formation. The presence of various salts in the well bore fluid lowers the resistivity of the fluid close to that of hydrocarbon-containing formations, which then can create significant difficulties in interpretation of electric logs by creating the appearance of conductive hydrocarbon formations when only the well bore fluid is present in a subterranean zone.

The analysis and resistivity of the various solutions are set forth in the following Tables.

TABLE XI

Potassium Chloride Solutions*
Selected Ion Analysis

| Sample No. | $K^+$ | $Na^+$ | $Ca^{++}$ | $Mg^{++}$ | $Zn^{++}$ | $Cl^-$ | Ionic Strength $\mu$ | Temperature °F. | Resistivity $\rho$ |
|---|---|---|---|---|---|---|---|---|---|
| 1 | 150,000 | 7.9 | 1.16 | 0.190 | 0.26 | 130,090 | 3.7644 | 76.9 | 0.028 |
| 2 | 113,370 | 8.0 | 5.15 | 0.156 | 0.19 | 90,512 | 2.7267 | 76.9 | 0.030 |
| 3 | 84,000 | 8.1 | 4.11 | 0.167 | 0.17 | 78,605 | 2.1831 | 76.5 | 0.043 |
| 4 | 58,800 | 4.6 | 2.99 | 0.099 | 0.10 | 55,004 | 1.5279 | 77.1 | 0.063 |
| 5 | 34,000 | 1.92 | 1.19 | 0.051 | 0.06 | 32,356 | 0.8911 | 73.2 | 0.108 |
| 6 | 23,800 | 4.0 | 2.48 | 0.077 | 0.04 | 20,633 | 0.5956 | 76.7 | 0.152 |
| 7 | 17,200 | 1.53 | 1.53 | 0.037 | 0.02 | 17,898 | 0.4725 | 76.3 | 0.199 |
| 8 | 11,840 | 3.4 | 1.45 | 0.050 | 0.03 | 10,658 | 0.3019 | 76.7 | 0.291 |
| 9 | 5,820 | 0.56 | 1.01 | 0.020 | <0.01 | 5,083 | 0.1462 | 77.8 | 0.565 |
| 10 | 3,875 | 3.9 | 6.66 | 0.125 | 0.01 | 3,475 | 0.0990 | 76.4 | 0.749 |
| 11 | 1,220 | 0.93 | 0.29 | 0.010 | <0.01 | 1,051 | 0.0305 | 78.1 | 2.44 |

No bromide or sulfate was detected in any sample.
*Concentration expressed as mg/l.
$\rho$ = ohm-meter

TABLE XII

Potassium Acetate Solutions*
Selected Ion Analysis

| Sample No. | $K^+$ | $Na^+$ | $Ca^{++}$ | $Mg^{++}$ | $Zn^{++}$ | $CH_3C(=O)O^-$ | Ionic Strength $\mu$ | Temperature °F. | Resistivity $\rho$ |
|---|---|---|---|---|---|---|---|---|---|
| 1 | 150,000 | 197 | 1.33 | 0.436 | 0.13 | 226,854.3 | 3.8450 | 75.9 | 0.067 |
| 2 | 115,200 | 155 | 1.33 | 0.392 | 0.25 | 174,235.1 | 2.9532 | 77.4 | 0.071 |
| 3 | 85,600 | 117 | 1.91 | 0.345 | 0.08 | 129.473.8 | 2.1945 | 77.4 | 0.082 |
| 4 | 57,800 | 81.0 | 1.04 | 0.245 | 0.05 | 87,429.6 | 1.4819 | 77.2 | 0.107 |
| 5 | 34,400 | 45.9 | 1.04 | 0.157 | 0.05 | 52,029.6 | 0.8819 | 75.9 | 0.162 |
| 6 | 23,200 | 34.5 | 1.56 | 0.126 | 0.02 | 35,101.4 | 0.5950 | 76.8 | 0.224 |
| 7 | 17,300 | 26.4 | 1.80 | 0.099 | 0.03 | 26,178.4 | 0.4438 | 79.0 | 0.286 |
| 8 | 11,280 | 18.9 | 2.61 | 0.116 | 0.01 | 17,077.7 | 0.2895 | 77.0 | 0.413 |
| 9 | 5,740 | 9.60 | 0.81 | 0.045 | <0.01 | 8,688.0 | 0.1473 | 76.8 | 0.772 |
| 10 | 1,230 | 3.75 | 0.77 | 0.019 | <0.01 | 1,868.0 | 0.0317 | 76.9 | 3.08 |

No bromide or sulfate was detected in any sample.
*Concentration expressed as mg/l.
$\rho$ = ohm-meter

TABLE XIII

Selected Ion Analysis
Combinations of Potassium Chloride and Potassium Acetate Solutions

| Sample No. | Solution Concentration % | KCL CH$_3$COOK Ratio | $K^+$ | $Na^+$ | $Ca^{++}$ | $Mg^{++}$ | $Cl^-$ | $Br^-$ | $SO_4^=$ | $CH_3C(=O)O^-$ | $Zn^{++}$ | Ionic Strength $\mu$ | Temperature F.° | Resistivity $\rho$ |
|---|---|---|---|---|---|---|---|---|---|---|---|---|---|---|
| 1 | 3 | 25/75 | 17,500 | 18.9 | 1.24 | 0.10 | 3,687 | Tr. | | 20,324 | 0.06 | 0.4485 | 77.0 | 0.261 |
| 2 | 3 | 50/50 | 17,500 | 13.3 | 1.33 | 0.09 | 7,286 | 14 | | 14,316 | 0.65 | 0.4483 | 77.4 | 0.237 |
| 3 | 3 | 75/25 | 17,600 | 7.9 | 1.80 | 0.08 | 11,103 | 23 | | 8,090 | 0.25 | 0.4505 | 75.1 | 0.223 |
| 4 | 6 | 25/75 | 34,800 | 44.5 | 1.31 | 0.15 | 7,373 | Tr. | Tr. | 40,360 | 0.12 | 0.8921 | 74.5 | 0.145 |
| 5 | 6 | 50/50 | 35,400 | 25.3 | 1.06 | 0.13 | 14,746 | Tr. | | 28.946 | 0.18 | 0.9066 | 75.0 | 0.129 |
| 6 | 6 | 75/25 | 34,800 | 13.7 | 0.84 | 0.10 | 22,119 | Tr. | Tr. | 15,740 | 0.17 | 0.8907 | 73.6 | 0.119 |

Concentrations in mg/l
$\rho$ = omh-meter

TABLE XIV

Synthetic Drilling Fluid Formulations

| Components | I | II | III | IV |
|---|---|---|---|---|
| Fresh water, ml. | 328.0 | 328.0 | 328.0 | 328.0 |
| CH$_3$COOK, gm. | 13.79 | 27.58 | — | — |
| KCl | — | — | 10.5 | 21.0 |
| Sepiolite, gm. | 15.0 | 15.0 | 15.0 | 15.0 |
| High molecular weight, partially hydrolyzed polyacrylamide, gm. | 1.0 | 1.0 | 1.0 | 1.0 |
| Short chain sodium polyacrylate (mole wt. 3,000), gm. | 1.0 | 1.0 | 1.0 | 1.0 |
| Long chain sodium polyacrylate (mole wt. 350,000), gm. | 2.0 | 2.0 | 2.0 | 2.0 |
| KOH, gm. | 1.0 | 1.0 | 1.0 | 1.0 |
| Barite, gm. | 92.0 | 92.0 | 92.0 | 92.0 |

TABLE XV

Resistivity of Synthetic Drilling Fluid Filtrates and Filter Cakes

| Sample* | K+, mg/l | Filtrate Resistivity ρ | Filtrate Temperature F.° | Cake Resistivity ρ | Cake Temperature F.° |
|---|---|---|---|---|---|
| I | 14,956 | 0.261 | 75.0 | 0.436 | 73.5 |
| II | 27,797 | 0.164 | 74.2 | 0.233 | 71.8 |
| III | 15,283 | 0.195 | 73.5 | 0.353 | 71.4 |
| IV | 29,947 | 0.105 | 73.2 | 0.166 | 72.6 |

*See Table XIV for formulation.
ρ = in ohm-meter

TABLE XVI

Analysis/Resistivity of Brines and Waters

| Sample | Cations, mg/l K+ | Na+ | Ca++ | Mg++ | Zn++ | Anions, mg/l Cl— | Br— | SO4= | Ionic Strength λ | Temperature F.° | Resistivity ρ |
|---|---|---|---|---|---|---|---|---|---|---|---|
| Seawater | 450 | 10,800 | 338 | 1,320 | <0.1 | 19,348 | Trace | 2,800 | 0.6972 | 77.8 | 0.195 |
| Connate Water | 345 | 119,000 | 264 | 1,180 | 0.5 | 193,720 | Trace | 2,574 | 5.4873 | 78.7 | 0.039 |
| Deionized water, stored 6 months | <2 | 4.36 | 0.38 | 0.44 | 0.01 | 2.58 | — | — | 0.0018 | 75.4 | 170.4 |
| Deionized water, fresh | <2 | 0.87 | 0.0 | 0.027 | 0.04 | 0.35 | — | — | 0.000038 | 77.0 | 17.32 |
| Tap water | 24 | 45 | 35.5 | 9.7 | 0.20 | 58.4 | — | 11.3 | 0.0036 | 77.6 | 16.42 |

The data set forth in the foregoing tables clearly illustrates the resistivity values of the potassium acetate solutions are consistently higher than those for potassium chloride-containing solutions. The higher resistivity values of the potassium acetate solutions compared to the potassium chloride solutions at equivalent potassium ion concentration in the synthetic drilling fluid filtrates and filter cakes clearly illustrates that the acetate ion is more readily distinguished than the chloride ion from the subterranean formations resistivity with respect to well log interpretation.

While preferred embodiments of the invention have been described herein, changes and modifications may be made in the method by an individual skilled in the art without departing from the spirit or scope of the invention as set forth in the appended claims.

What is claimed is:

1. A method of effecting an electric log of a well bore penetrating a subterranean formation comprising:
   introducing a fluid composition comprising a solution of a water-soluble organic acid salt having the general formula:

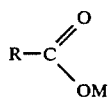

wherein R is hydrogen or a methyl, ethyl or propyl radical and M is potassium into said well bore in an amount sufficient to displace at least a portion of any other well bore fluid containing ions which interfere with an electric log present in said well bore from a selected zone in said formation in which an electric log is to be effected;
positioning electric logging apparatus in said selected zone in which an electric log is to be effected; and
logging said selected zone with said electric logging apparatus whereby interference caused by the presence of said interfering ions in said other well bore fluid with said measurement of formation resistivity by said logging apparatus is minimized.

2. The method of claim 1 wherein said introduced fluid includes a viscosity increasing agent comprising at least one member selected from the group consisting of hydroxyethylcellulose, montmorillonite, sepiolite and attapulgite.

3. The method of claim 2 wherein said viscosity increasing agent is present in said fluid in an amount of from about 1 to about 50 pounds per barrel of said fluid composition.

4. The method of claim 1 wherein said introduced fluid includes a fluid-loss reducing and rheology stabilizing agent comprising at least one member selected from the group consisting of pregelatinized starch, vinylamide-vinylsulfonate terpolymer and hydroxyethylcellulose.

5. The method of claim 4 wherein said fluid-loss reducing and rheology stabilizing agent is present in said fluid in an amount of from about 1 to about 30 pounds per barrel of said fluid composition.

6. The method of claim 1 wherein said fluid composition is defined further to include a solid weighting agent present in said composition in an amount sufficient to increase the density thereof to a level in the range of from about 8.5 to about 19 pounds per gallon of said fluid composition.

7. The method of claim 1 wherein said water-soluble organic acid salt comprises potassium acetate.

8. A method of effecting an electric log of a well bore penetrating a subterranean clay-containing formation in which a chloride-containing solution is present comprising:
   introducing a fluid composition comprising an aqueous solution of a water-soluble organic acid salt having the general formula:

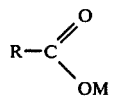

wherein R is hydrogen or a methyl, ethyl or propyl radical and M is potassium into said well bore whereby said fluid composition substantially stabilizes the clay-containing formation against clay sloughing and swelling and displaces at least a portion of said other chloride-containing well bore fluid which is present in said well bore from a selected zone in said formation in which an electric log is to be effected;
positioning electric logging apparatus in said selected zone in which an electric log is to be effected; and logging said selected zone with said logging apparatus whereby a measurement of the formation rock matrix resistivity and formation fluids resistivity is effected without substantial interference caused by the presence of said chloride-containing solution in said subterranean clay-containing formation.

9. The method of claim 8 wherein said introduced fluid includes a viscosity increasing agent comprising at least one member selected from the group consisting of hydroxyethylcellulose, montmorillonite, sepiolite and attapulgite.

10. The method of claim 9 wherein said viscosity increasing agent is present in said fluid in an amount of from about 1 to about 50 pounds per barrel of said fluid composition.

11. The method of claim 8 wherein said introduced fluid includes a fluid-loss reducing and rheology stabilizing agent comprising at least one member selected from the group consisting of pregelatinized starch, vinylamide-vinylsulfonate terpolymer and hydroxyethylcellulose.

12. The method of claim 11 wherein said fluid-loss reducing and rheology stabilizing agent is present in said fluid in an amount of from about 1 to about 30 pounds per barrel of said fluid composition.

13. The method of claim 8 wherein said fluid composition is defined further to include a solid weighting agent present in said composition in an amount sufficient to increase the density thereof to a level in the range of from about 8.5 to about 19 pounds per gallon of said fluid composition.

14. The method of claim 8 wherein said water-soluble organic acid salt comprises potassium acetate.

* * * * *